May 2, 1939. H. H. A. HEUER 2,156,986
HORTICULTURE SHADING DEVICE
Filed Aug. 2, 1937
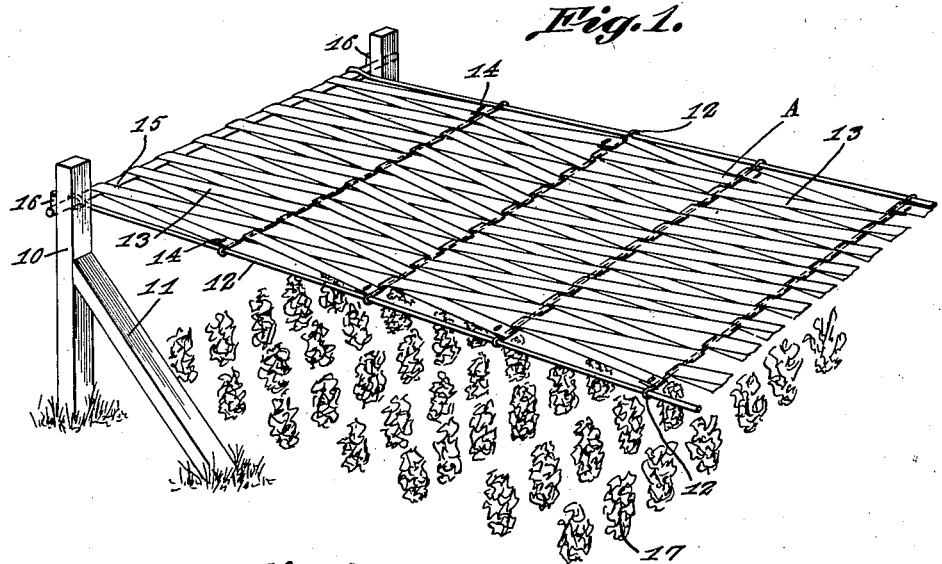
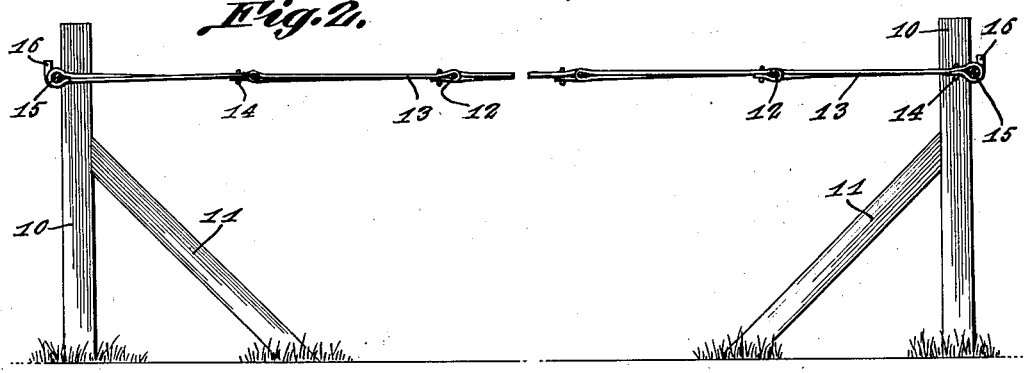
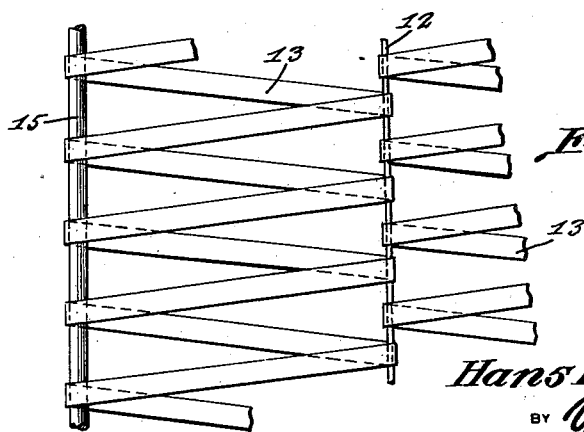
Hans H. A. Heuer, INVENTOR
BY Victor J. Evans & Co.
ATTORNEYS Patented May 2, 1939

2,156,986

UNITED STATES PATENT OFFICE 2,156,986

HORTICULTURE SHADING DEVICE

Hans H. A. Heuer, Rochester, Mich.

Application August 2, 1937, Serial No. 157,060

3 Claims. (Cl. 47—28)

The invention relates to a shade roof and more especially to a horticultural shading device.

The primary object of the invention is the provision of a device of this character, wherein the same by reason of its particular construction is beneficial for tropical, subtropical as well as more temperate horticulture in that growing plants will be shielded partially from the sun and protected against frost damage, thereby increasing the growth of such plants.

Another object of the invention is the provision of a device of this character, wherein the same when not in use can be rolled up, stored in the least possible space and is susceptible of being readily set up for use in shading growing crops for increasing their growth and protecting the same from weather elements detrimental to the growth thereof, being economical in the manufacture of the same and assured of durability and increased life.

A still further object of the invention is the provision of a device of this character, which is extremely simple in construction, thoroughly reliable and effective in operation, light in weight and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary perspective view of a device constructed in accordance with the invention and shown set up for use.

Figure 2 is a vertical longitudinal sectional view through the device.

Figure 3 is an enlarged fragmentary top plan view.

Similar reference characters indicate corresponding parts throughout the several views in the drawing.

Referring to the drawing in detail, A designates generally a major portion of the device constituting the present invention and involves a pair of stakes or uprights 10, these being anchored in the soil or ground in spaced relation to each other at each end of said device, being braced at 11 in their upright position. Horizontally suspended by the uprights or stakes 10 is a roofing hereinafter fully described.

The roofing comprises a plurality of spaced transversely disposed coupling bars or rods 12 about which are looped strips 13, each being looped about the bars or rods 12 in a zigzag fashion so that the upper and lower stretches of these strips will lie diagonally and reversely angled to each other throughout the extent of the roofing. The ends of the strips are made fast preferably by staples 14 about the bars or rods 12 yet these ends may be adhesively secured in place about said bars or rods or otherwise fixedly held thereto.

Each outermost bar 15 is of greater length than the bars or rods 12 and is laterally extended beyond opposite longer edges of the roofing for engagement or seating in hooks 16 secured in the stakes or uprights 10 and in this manner the roofing can be stretched taut between the end stakes or uprights for the coverage of a patch of growing plants or the like 17 and thus partially shield such plants or the like from the sun and avoiding damage by frost thereto.

The strips 13 are preferably made from a composite sheet material or paper dark in color and suitably waterproof. Each strip 13 is of uniform width throughout the extent thereof and the looping of these lengths of strips about the rods 12 enables the rolling of the roofing when not set up for use and thus permitting it to be stored in the least possible space.

By protecting the plants or the like 17 in the manner before described, irrigation of the patch thereof is minimized and plant diseases cured while the partial shielding of such plants or the like from the sun increases the growth thereof to a material degree.

It is contemplated that the strips 13 can be trained about light material, such as wood or other material, these being in rod or strip form and in substitute for the rods 12 of metal or wire.

What is claimed is:

1. A device of the character described comprising a roof formed with a plurality of spaced transversely disposed rods, and flat strips of freely flexible material wrapped about and extended between the rods in a zigzag fashion for effecting the lay of the flat areas thereof therebetween in approximately the same plane with each other.

2. A device of the character described comprising a roof formed with a plurality of spaced transversely disposed rods, flat strips of freely flexible material wrapped about and extended between the rods in a zigzag fashion for effecting the lay of the flat areas thereof therebetween in approximately the same plane with each other, and means for engagement with the outermost rods and holding the roof horizontally elevated from a ground surface.

3. A device of the character described comprising a roof formed with a plurality of spaced transversely disposed rods, flat strips of freely flexible material wrapped about and extended between the rods in a zigzag fashion for effecting the lay of the flat areas thereof therebetween in approximately the same plane with each other, means for engagement with the outermost rods and holding the roof horizontally elevated from a ground surface, and means for fastening the ends of the strips about said rods.

HANS H. A. HEUER.